Feb. 25, 1947.  E. W. BAGGOTT  2,416,426
RAKING DEVICE
Filed March 16, 1945
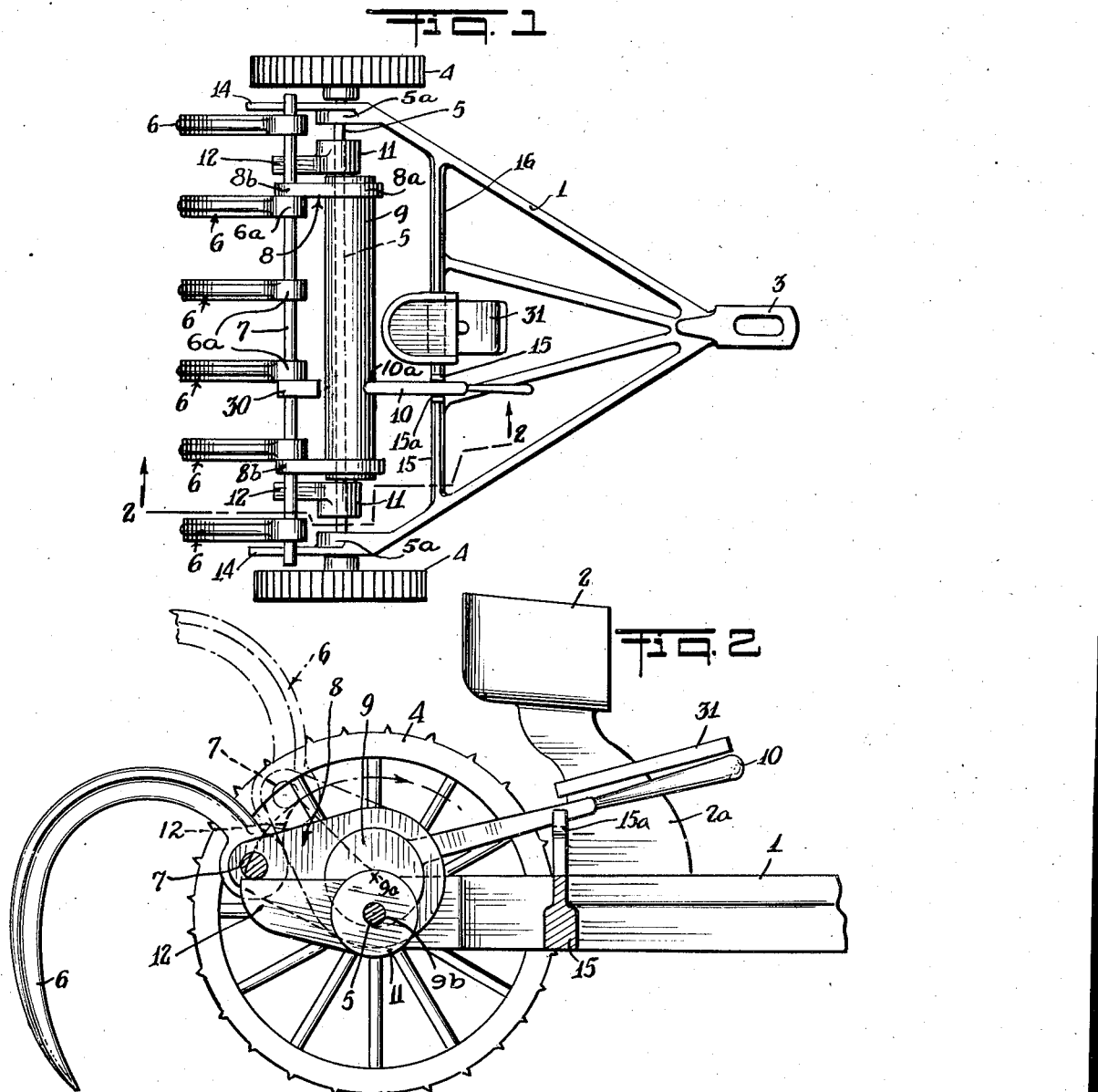
INVENTOR.
Edmund W. Baggott
BY Moor & Blum
ATTORNEYS Patented Feb. 25, 1947

2,416,426

UNITED STATES PATENT OFFICE 2,416,426

RAKING DEVICE

Edmund W. Baggott, Brooklyn, N. Y., assignor to Ideal Novelty & Toy Co., Long Island City, N. Y., a corporation of New York Application March 16, 1945, Serial No. 583,043

3 Claims. (Cl. 56—386)

My invention relates to a new and improved raking device.

According to my invention, I provide a vehicle which can be propelled forwardly in a longitudinal direction. The wheels of said vehicle are fixed to a lateral shaft. Radial lifting arms are fixed to said shaft. Rake-blades are fixed to a lateral blade-supporting rod, which is intermittently raised by said lifting arms, when said blade-supporting rod is in operative position. Said blade-supporting rod can be shifted rearwardly to inoperative position, in which said rod clears said lifting arms.

Other objects and other advantages are stated in the annexed description and drawings, which illustrate a preferred embodiment thereof.

Fig. 1 is a top plan view.

Fig. 2 is a section on the line 2—2 of Fig. 1, on a larger scale than Fig. 1.

The device has a frame 1, which has a cross-bar 16, and rear longitudinal legs 14. A seat 2 is fixed to vertical bracket 2a, which is fixed to cross-bar 16. Footrest 31 is fixed to bracket 2a.

Shaft 5 is turnably mounted in bearings 5a of frame 1. Wheels 4 are fixed to shaft 5.

Collars 11 are fixed to shaft 5. Longitudinal lifting arms 12, which are integral with collars 11, are perpendicular to the laterally disposed longitudinal axis of shaft 5.

The eccentric 9 has a cylindrical periphery. Said eccentric 9 has a cylindrical bore 9b, in which shaft 5 fits, so that eccentric 9 is turnable about the axis of shaft 5. Said eccentric 9 has an axis 9a. In the operative position of eccentric 9 which is shown in Fig. 2, axis 9a is directly vertically above the axis of shaft 5. Said eccentric 9 fits turnably in bores of the hubs 8a of control straps 8. The tips 8b of control straps 8 have cylindrical bores, in which the cylindrical rod 7 fits. The rake-blades 6 have hubs 6a, which are provided with cylindrical bores, through which rod 7 extends. Said hubs 6a are fixed to rod 7, as by a drive fit or by any conventional means.

The full-line position of rod 7 in Fig. 2 is the bottom position of said rod 7, just before said rod 7 is raised from its said bottom position by the lifting arms 12. In such bottom position, the ends of rod 7 rest upon legs 14. The broken-line position of rod 7 in Fig. 2 shows the highest position to which said rod 7 is raised by lifting arms 12. The full-line and broken-line positions of rake-blades 6 in Fig. 2, correspond to said full-line and broken-line positions of Fig. 2.

When eccentric 9 is in its operative position of Fig. 2, the rod 7 overlies the lifting arms 12, during only a part of the clockwise turning movement of said arms 12 around the axis of shaft 5. When rod 7 is thus raised from said full-line position to said broken-line position, said rod 7 has a turning movement around the axis 9a of eccentric 9, while said axis 9a is located as shown in Fig. 2.

Control handle 10 is fixed at 10a to eccentric 9.

When the axis 9a of eccentric 9 is in its top position, as shown in Fig. 2, said handle 10 rests upon a cross-bar 15a, which is fixed to respective vertical lugs 15, which are fixed to cross-bar 16 of frame 1. Control-handle 10 is then located between the top end-portions of lugs 15.

The vehicle is forwardly pulled or propelled, when wheels 4 are turned clockwise, as shown by the arrow in Fig. 2.

When wheels 4 are turned clockwise, and eccentric 9 is in its operative position, the rod 7 is thus intermittently raised in a clockwise turning movement, around the axis 9a of eccentric 9. When rod 7 is raised to the broken-line position which is shown in Fig. 2, said rod 7 clears the lifting rods or arms 12. Rod 7 then drops back to its full-line position, in which it is supported on legs 14 of frame 1.

The weight of control arm 10 biases the eccentric 9 to turn clockwise, so that eccentric 9 is held in its operative position, when the vehicle is moved forwardly. There may optionally be a frictional fit between shaft 5 and the corresponding bore of eccentric 9 in which said shaft 5 is located, thus providing a slip-frictional coupling between shaft 5 and eccentric 9. This frictional force biases the eccentric 9 to remain in its operative position, when the vehicle is pulled or propelled forwardly. If desired, there may be little or no friction between shaft 5 and eccentric 9.

When eccentric 9 is turned counterclockwise from its operative position of Fig. 2 to its inoperative position, and assuming that rod 7 is in its bottom position said rod 7 slides longitudinally rearwardly on the legs 14 of frame 1, to an inoperative position, in which said rod 7 clears the lifting rods or arms 12. The vehicle can then be propelled forwardly, while rod 7 remains supported in its bottom position on legs 14 of frame 1, with the blades 6 held in the down position, substantially as shown in Fig. 2.

A vertical stop 30 is optionally fixed to rod 7. When eccentric 9 is turned counterclockwise from its operative position to its inoperative position, the handle 10 abuts said stop 30. Handle 10 is then inclined rearwardly from the vertical direction, so that it biases the eccentric 9 to remain in its inoperative position.

The invention is not limited to the specific device illustrated herein.

In general, the member 7 is a movable member which can be raised and lowered relative to frame 1. The legs 14 constitute supporting means which support member 7 in its lower position. Said member 7 is longitudinally slidable to-and-fro, relative to supporting means 14. The eccentric 9 constitutes movable control means which are supported on said frame, for example, by means of shaft 5. The member or members 8 constitute connecting means which connect movable member 7 to said control means 9.

When rod 7 abuts legs 14, said rod 7 is in its predetermined lower position. The straps 8 are designated as control connecting means which are connected to eccentric 9 and rod 7.

I claim:

1. A vehicle which has a frame in which a lateral shaft is turnably mounted, said vehicle having supporting wheels which are fixed to said shaft, a blade-supporting rod, said frame having supporting means located and constructed to support said rod in a predetermined lower position of said rod, said rod being longitudinally slidable on said supporting means, an eccentric which is mounted turnably on said shaft, control connecting means connected to said eccentric and to said rod, said rod being fixed to said control connecting means, said eccentric being turnably connected to said control connecting means, said rod being moved longitudinally to-and-fro when said eccentric is turned relative to said shaft, said connecting means being turnable around the central longitudinal axis of said eccentric, a radially disposed lifting arm which is fixed to said shaft, said eccentric being turnable relative to said shaft to an operative position of said eccentric in which the central longitudinal axis of said eccentric is located above the longitudinal axis of said shaft, said rod then overlying said lifting arm during only a part of the rotary movement of said lifting arm, said eccentric being turnable relative to said shaft to an inoperative position in which said rod is located rearwardly of said lifting arm and supported on said supporting means.

2. A vehicle according to claim 1, in which said eccentric has its longitudinal axis located substantially vertically above the axis of said shaft when said eccentric is in said operative position, a handle fixed to said eccentric and extending forwardly therefrom, said frame having a support on which said handle rests when said eccentric is in said operative position.

3. A vehicle which has a frame in which a lateral shaft is turnably mounted, said vehicle having supporting wheels which are fixed to said shaft, a movable member which can be raised and lowered relative to said frame, said frame having supporting means to support said movable member in the lower position of said movable member, said movable member being longitudinally slidable to-and-fro relative to said supporting means, said shaft having a lifting arm thereto, said lifting arm extending transversely from said shaft, movable control means supported on said frame and movable relative to said frame, said movable control means being connected to said movable member by connecting means, said connecting means being fixed to said movable member, said movable control means being movable relative to said connecting means, said movable control means being movable to an operative position in which said movable member overlies said lifting arm during only a part of the rotary movement of said lifting arm in unison with said shaft, said control means being movable to an inoperative position in which said movable member clears said lifting arm and said movable member remains supported on said supporting means.

EDMUND W. BAGGOTT.

REFERENCES CITED

The following references are of record in the file of this patent:

UNITED STATES PATENTS

| Number | Name | Date |
|---|---|---|
| 241,497 | Ellwood | Apr. 22, 1879 |
| 216,239 | Titus | June 3, 1879 |
| 1,188,190 | Masterson | June 20, 1916 |
| 1,838,670 | Silva | Dec. 29, 1931 |